(12) United States Patent
Choi et al.

(10) Patent No.: US 11,022,269 B2
(45) Date of Patent: Jun. 1, 2021

(54) LIGHTING DEVICE

(71) Applicant: LG INNOTEK CO., LTD., Seoul (KR)

(72) Inventors: Young Jae Choi, Seoul (KR); Seong Jin Kim, Seoul (KR); Hyun Duck Yang, Seoul (KR); Eay Jin Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/605,836

(22) PCT Filed: Apr. 11, 2018

(86) PCT No.: PCT/KR2018/004226
§ 371 (c)(1),
(2) Date: Oct. 17, 2019

(87) PCT Pub. No.: WO2018/194312
PCT Pub. Date: Oct. 25, 2018

(65) Prior Publication Data
US 2020/0049322 A1  Feb. 13, 2020

(30) Foreign Application Priority Data

Apr. 21, 2017 (KR) .................. 10-2017-0051508

(51) Int. Cl.
*F21S 43/31* (2018.01)
*F21S 43/20* (2018.01)
(Continued)

(52) U.S. Cl.
CPC ............. *F21S 43/31* (2018.01); *F21S 43/26* (2018.01); *G02B 30/00* (2020.01);
(Continued)

(58) Field of Classification Search
CPC ....................................................... F21S 43/31
See application file for complete search history.

(56) References Cited

U.S. PATENT DOCUMENTS 7,238,075 B2 * 7/2007 Brodsky ................. B63B 45/04
441/80
9,969,469 B1 * 5/2018 Bell ........................ B63B 32/60
(Continued)

FOREIGN PATENT DOCUMENTS

CN    103994387       8/2014
JP    2016-181372    10/2016
(Continued)

OTHER PUBLICATIONS

European Search Report dated May 4, 2020 issued in Application No. 18788124.8.
(Continued)

*Primary Examiner* — Mary Ellen Bowman
(74) *Attorney, Agent, or Firm* — KED & Associates LLP

(57) ABSTRACT

A lighting device according to one embodiment comprises: a housing having an opening; a half mirror member arranged in the opening; a first light source unit for emitting light at the half mirror member; a mirror member for re-reflecting light reflected by the half mirror member; a diffusion plate arranged between the first light source unit and the half mirror member; and a guide unit protruding from the lower surface of the housing, wherein the housing includes a first area and a second area formed by the guide unit, the first light source unit is arranged in the first area and the mirror member is arranged in the second area, and the diffusion plate can be supported by the guide unit. Therefore, the lighting device can implement various three-dimensional effects of an optical image according to a field of view by using the half mirror member and the mirror member during lighting.

15 Claims, 9 Drawing Sheets

(51) Int. Cl.
*G02B 30/00* (2020.01)
*F21W 103/60* (2018.01)
*F21W 103/10* (2018.01)
*F21W 103/35* (2018.01)

(52) U.S. Cl.
CPC ..... *F21W 2103/10* (2018.01); *F21W 2103/35* (2018.01); *F21W 2103/60* (2018.01)

(56) References Cited

U.S. PATENT DOCUMENTS

| | | | |
|---|---|---|---|
| 10,195,347 B1* | 2/2019 | Berkman | A61M 5/31 |
| 2006/0013012 A1 | 1/2006 | Befelein | |
| 2010/0048071 A1* | 2/2010 | Nascimento | B63B 32/57 441/74 |
| 2015/0219908 A1 | 8/2015 | Lee et al. | |
| 2017/0009952 A1* | 1/2017 | Tai | F21S 43/40 |
| 2017/0059108 A1* | 3/2017 | Hardy | F21S 43/241 |
| 2017/0227183 A1* | 8/2017 | Oho | F21V 7/00 |

FOREIGN PATENT DOCUMENTS

| | | |
|---|---|---|
| KR | 10-2013-0011779 | 1/2013 |
| KR | 10-2015-0092651 | 8/2015 |
| KR | 10-2016-0047249 | 5/2016 |
| KR | 10-2016-0091867 | 8/2016 |
| KR | 10-2017-0026037 | 3/2017 |

OTHER PUBLICATIONS

International Search Report (with English Translation) and Written Opinion dated Jul. 16, 2018 issued in Application No. PCT/KR2018/004226.

* cited by examiner

LIGHTING DEVICE

CROSS-REFERENCE TO RELATED PATENT APPLICATIONS

This application is a U.S. National Stage Application under 35 U.S.C. § 371 of PCT Application No. PCT/KR2018/004226, filed Apr. 11, 2018, which claims priority to Korean Patent Application No. 10-2017-0051508, filed Apr. 21, 2017, whose entire disclosures are hereby incorporated by reference.

TECHNICAL FIELD

Embodiments relate to a lighting device which implements a three-dimensional light image.

BACKGROUND ART

Recently, a lighting device has been developed to have three-dimensional lighting formed from dots, lines, and planes.

The lighting device may be used for the purpose of increasing intensity of illumination of a limited place or for uniform light emitting efficiency. Furthermore, the lighting device may satisfy light distribution regulations by adjusting brightness and may be used as a vehicular lamp.

Here, a demand for implementing a variety of shapes or three-dimensional effect of the lighting device in consideration of design component has been increasing.

However, in a conventional vehicular lighting device, a three-dimensionally effective lighting device is implemented by arranging a plurality of light emitting diode (LED) light sources in a three-dimensional structure such as a step type structure installed along a curved surface of a vehicle and by reflecting light through a mirror formed on an inner surface of the three-dimensional structure.

As described above, since the three-dimensional structure and the plurality of LED light sources are arranged in the conventional vehicular lighting device to implement three-dimensional lighting, it is complicated to design and manufacture the conventional vehicular lighting device.

Also, in the conventional vehicular lighting device, since it is necessary to adjust light intensity or brightness required for a vehicle by covering a large light emitting area of the lighting device using an LED light source having a narrow radiation angle, it is necessary to use a large number of LED light sources. Accordingly, costs thereof increase.

For example, in the conventional vehicular lighting device, since three-dimensional lighting is implemented on the basis of the three-dimensional structure, in order to manufacture natural three-dimensional lighting, a complicated structure in which a plurality of LED lightings are densely arranged between the three-dimensional structures and a complicated control process of controlling brightness of the plurality of LED lightings to be gradually brighter or darker are necessary. However, such environments ultimately cause an increase in cost.

Also, corresponding to a lighting device size restricted by a consumer's demand is difficult for the conventional vehicular lighting device. Accordingly, due to restrictions in design, it is more difficult for the conventional vehicular lighting device to implement a variety of three-dimensional effects.

DISCLOSURE

Technical Problem

The present invention is directed to providing a lighting device capable of implementing an image like a mirror when the lighting device is turned off and of implementing a light image providing a variety of three-dimensional effects when the lighting device is turned on using a half mirror member and a mirror member.

The present invention is also directed to providing a lighting device capable of implementing a variety of three-dimensional light images having a sense of depth using a guide portion due to a limitation in design caused by a size of the lighting device.

The present invention is also directed to providing a lighting device capable of implementing a clear light image while improving space utilization by increasing light uniformity using the guide portion.

The present invention is also directed to providing a lighting device capable of implementing a three-dimensional light image having a sense of depth while simultaneously providing a clear light image while increasing space utilization using the guide portion using a half mirror member and a mirror member.

Aspects of the embodiment are not limited to the above-stated aspects and other unstated aspects can be clearly understood by those skilled in the art from the following description.

Technical Solution

One aspect of the present invention provides a lighting device including a housing with an opening formed therein, a half mirror member disposed in the opening, a first light source portion configured to emit light toward the half mirror member, a mirror member configured to reflect light reflected by the half mirror member, a diffusion plate disposed between the first light source portion and the half mirror member, and a guide portion protruding from a bottom surface of the housing. Here, the housing includes a first area and a second area which are formed by the guide portion. The first light source portion is disposed in the first area, and the mirror member is disposed in the second area. Also, the diffusion plate is supported by the guide portion.

Another aspect of the present invention provides a lighting device including a housing with an opening formed therein, a half mirror member disposed to cover the opening, a first light source portion disposed on a bottom surface of the housing and configured to emit light toward the half mirror member, a mirror member disposed on the bottom surface of the housing and configured to reflect light reflected by the half mirror member; a guide portion disposed to protrude between the first light source portion and the mirror member, and a diffusion plate disposed on an optical path between the first light source portion and the half mirror member. Here, the bottom surface of the housing may be divided into a first bottom surface and a second bottom surface by the guide portion formed to protrude from the bottom surface. Also, the first light source portion may be disposed on the first bottom surface, and the mirror member may be disposed on the second bottom surface.

The guide portion may be formed to protrude to a certain height h, and the first light source portion and the mirror member may be arranged to be spaced at a certain distance d apart by the guide portion.

A light emission surface of the first light source portion may be disposed to be spaced at a first gap G1 apart from the diffusion plate.

The first light source portion may be formed to have a certain thickness t1, and the first gap G1 may be adjusted according to the thickness t1 of the first light source portion.

The diffusion plate may be disposed to be spaced at a certain second gap G2 apart from a bottom surface of the half mirror member.

The diffusion plate may be formed to have a certain thickness t2, and the second gap G2 may be adjusted according to the thickness t2 of the diffusion plate.

The second gap G2 may be greater than the first gap G1.

A reflective surface of the mirror member may be disposed to be spaced at a certain third gap G3 apart from a bottom surface of the half mirror member.

The mirror member may be formed to have a certain thickness t3, and the third gap G3 may be adjusted according to the thickness t3 of the mirror member.

The reflective surface of the mirror member may be disposed to form a certain height difference h1 from a top surface of the diffusion plate while being disposed to be lower than the top surface of the diffusion plate.

The reflective surface of the mirror member may be disposed to form a certain height difference h2 from a light emission surface of the light source portion.

The reflective surface of the mirror member may be disposed to be inclined at a certain angle θ on the basis of the light emission surface of the light source portion.

The lighting device may further include a stop lamp portion disposed in the housing. Here, the stop lamp portion may include a second printed circuit board and second light sources disposed on the second printed circuit board, and the second light sources may be turned on by a brake of a vehicle being operated.

The lighting device may further include a third light source disposed on the second printed circuit board and a pattern member disposed on an optical path of the third light source. Here, the pattern member may modify a shape of light emitted from the third light source.

The lighting device may further include an image lamp portion disposed between the second light sources of the stop lamp portion.

Advantageous Effects

According to embodiments, a lighting device may implement an image like a mirror when the lighting device is turned off and implement a light image providing a variety of three-dimensional effects when the lighting device is turned on by using a half mirror member configured to transmit a part of surface-emitted light and to reflect another part thereof and a mirror member.

Also, the lighting device may implement an image modified according to a viewing angle by using the half mirror member and the mirror member.

Also, the lighting device may implement a three-dimensional light image having a sense of depth by using the half mirror member and the mirror member configured to reflect light reflected by the half mirror member. Here, the lighting device may improve space utilization even with a limitation caused by a size of the lighting device by providing a reference of design using a guide portion.

Accordingly, the lighting device may reduce an overall thickness of the lighting device and may implement a variety of three-dimensional light images.

Also, the lighting device may increase light uniformity of light emitted from a first light source portion using the guide portion. Accordingly, clarity of the three-dimensional light image may be secured.

MODES OF THE INVENTION

Figure 1:
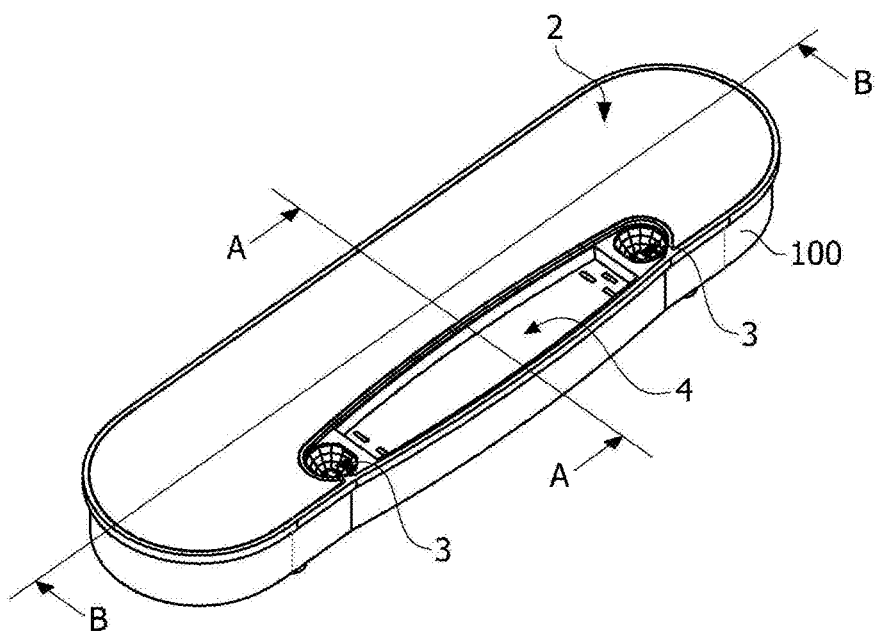
FIG. 1 is a perspective view of a lighting device according to an embodiment.

Although a variety of modifications and several embodiments of the present invention may be made, exemplary embodiments will be illustrated in the drawings and described. However, it should be understood that the present invention is not limited to the exemplary embodiments and includes all changes and equivalents or substitutes included in the concept and technical scope of the present invention.

The terms including ordinal numbers such as "second," "first," and the like may be used for describing a variety of components. However, the components are not limited by the terms. The terms are used only for distinguishing one component from another component. For example, without departing from the scope of the present invention, a second component may be referred to as a first component, and similarly, a first component may be referred to as a second component. The term "and/or" includes any and all combinations of one or a plurality of associated listed items.

When it is stated that one component is "connected" or "joined" to another component, it should be understood that the one component may be directly connected or joined to the other component but another component may be present therebetween. On the other hand, when it is described that one component is "directly connected" or "directly joined" to another component, it should be understood that no other component is present therebetween.

While the embodiments are described, when one component is described as being "on or under" another component, the two components may come into direct contact with each other or may come into indirect contact with each other with another component interposed therebetween. Also, the term "on or under" may include not only an upward direction but also a downward direction on the basis of one component.

Terms used herein are used merely for describing exemplary embodiments and are not intended to limit the present invention. Singular expressions, unless clearly defined otherwise in context, include plural expressions. Throughout the application, it should be understood that the terms "comprise," "have," and the like are used herein to specify the presence of stated features, numbers, steps, operations, elements, components or combinations thereof but do not preclude the presence or addition of one or more other features, numbers, steps, operations, elements, components, or combinations thereof.

Unless defined otherwise, the terms used herein including technical or scientific terms have the same meanings as those which are generally understood by one of ordinary skill in the art. Terms such as those defined in commonly used dictionaries should be construed as having meanings equal to contextual meanings of related art and should not be interpreted in an idealized or excessively formal sense unless defined otherwise herein.

Hereinafter, embodiments will be described in detail with reference to the attached drawings. Regardless of drawing's signs, equal or corresponding elements will be referred to as like reference numerals and an overlapped description thereof will be omitted.

A lighting device 1 according to an embodiment may be used in a vehicle lamp, a home-use lighting device, an industrial lighting device, an advertisement device installed indoor or outdoor, and the like.

When the lighting device 1 is used as a vehicle lighting device, it may be used in indoor lighting, a door scuff, a rear combination lamp, and the like of a vehicle.

Particularly, when the lighting device 1 is used as a rear combination lamp, the lighting device 1 may be used as a tail lamp while simultaneously further performing at least one of functions of a stop lamp and an image lamp.

Here, the tail lamp may inform a following vehicle of a location of a vehicle in a dark place. Also, the stop lamp and a brake of the vehicle work together such that it is possible to inform a following vehicle of a stall or speed-reduction state of the vehicle. Also, the image lamp may implement a variety of light images and increase a degree of freedom and aesthetics in design of the lighting device.

Referring to FIG. 1, the lighting device 1 may include a tail lamp portion 2, a stop lamp portion 3, and an image lamp portion 4. That is, the lighting device 1 may include only the tail lamp portion 2, and at least one of the stop lamp portion 3 and the image lamp portion 4 may be further disposed.

Referring to FIGS. 1 to 5, the lighting device 1 according to the embodiment may include a housing 100, a half mirror member 200 disposed on one side of the housing 100, a first light source portion 300, a diffusion plate 400, and a mirror member 500. Here, the half mirror member 200 and the diffusion plate 400 may be arranged on a light emission line of the first light source portion 300.

Accordingly, the lighting device 1 implements the tail lamp portion 2 using the housing 100, the half mirror member 200, the first light source portion 300, the diffusion plate 400, and the mirror member 500 so as to perform a function of a tail lamp.

Here, using the half mirror member 200 and the mirror member 500, the tail lamp portion 2 of the lighting device 1 may implement a mirror image such as a mirror when a lamp is turned off and may implement an emission image of light which provides a variety of three-dimensional effects when a lamp is turned on. Here, "three-dimensional effect" may be defined as implementing a light emission image (hereinafter, referred to as "light image") implemented by the lighting device 1 having a certain sense of depth (perspective) or a sense of volume.

Also, the lighting device 1 may implement a light image with a three-dimensional effect varying according to a viewing angle using the half mirror member 200 and the mirror member 500.

Figure 6:
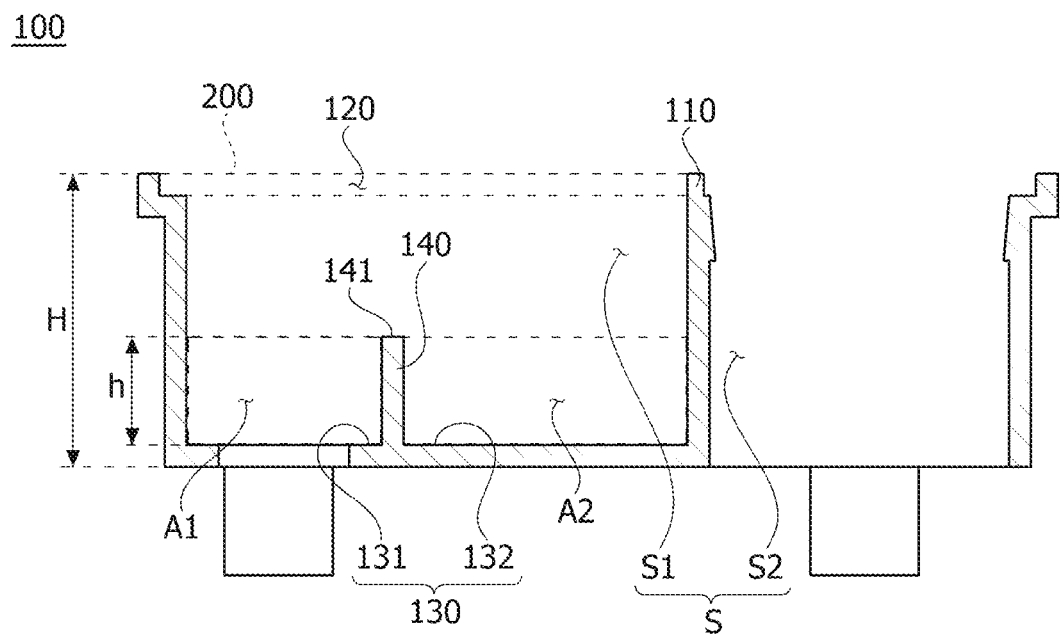
FIG. 6 is a cross-sectional view of a housing shown in FIG. 4.

Referring to FIG. 6, the housing 100 may be formed to have a cylindrical shape having a preset height H. Here, the height H may be determined by a consumer's demand. Accordingly, the lighting device 1 may have a designing limitation with respect to a size.

The housing 100 may have a space S formed therein. Also, the space S may include a first space S1 and a second space S2 divided by a wall 110. As shown in FIG. 6, an opening 120 may be formed in a top of the first space S1.

Also, a guide portion 140 may be disposed in the housing 100.

Accordingly, a first area A1 and a second area A2 distinguished by the guide portion 140 may be formed in the housing 100. The first light source portion 300 may be disposed in the first area A1, and the mirror member 500 may be disposed in the second area A2.

In detail, the guide portion 140 may be disposed on a bottom surface 130 of the housing to protrude therefrom. Here, the guide portion 140 may be integrated with the bottom surface 130 but is not limited thereto.

For example, the guide portion 140 may be formed to distinguish the bottom surface 130 into a first bottom surface 131 and a second bottom surface 132. Also, the first light source portion 300 may be disposed on the first bottom surface 131, and the mirror member 500 may be disposed on the second bottom surface 132.

Here, the guide portion 140 guides the first light source portion 300 and the mirror member 500 to be arranged at preset positions. Accordingly, the first light source portion 300 and the mirror member 500 may be arranged by the guide portion 140 to be spaced apart.

Figure 3:
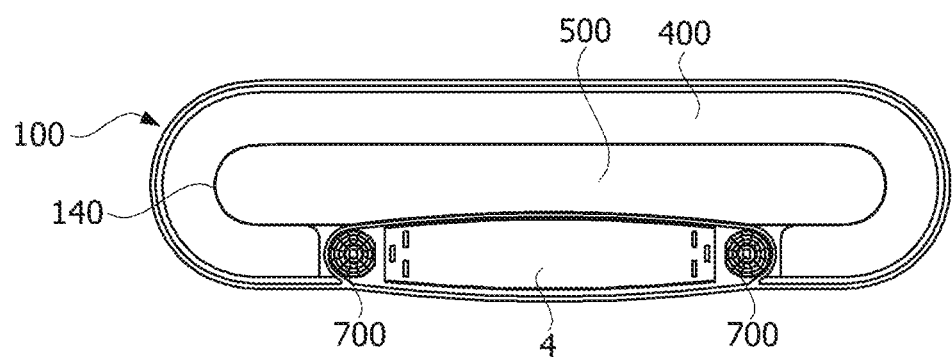
FIG. 3 is a plan view of the lighting device according to the embodiment from which a half mirror member is removed.

That is, the guide portion 140 may be disposed between the first light source portion 300 and the mirror member 500 such that the first light source portion 300 and the mirror member 500 may be arranged to be spaced at a certain separation distance d apart. Here, the separation distance d may be adjusted by a width of the guide portion 140. Here, as shown in FIG. 3, the guide portion 140 may be disposed to surround an inner surface of the first light source portion 300. Also, the guide portion 140 may be disposed to surround one side surface of the mirror member 500.

Meanwhile, the guide portion 140 may be formed on the bottom surface 130 of the housing 100 to protrude therefrom to a certain height h. Here, a top end surface 141 of the guide portion 140 may be disposed to be spaced at a certain distance apart from a bottom surface 210 of the half mirror member 200.

Also, the guide portion 140 formed to have the certain height h may guide light emitted from the first light source portion 300 toward the half mirror member 200 at the certain height h. Accordingly, the guide portion 140 may prevent the light emitted from the first light source portion 300 from being directly emitted toward the mirror member 500 and may provide an emission direction of the light so as to minimize optical interference with respect to light re-reflected by the mirror member 500.

Also, since the guide portion 140 prevents the light emitted from the first light source portion 300 from being scattered within the preset height h, light uniformity may be improved. Accordingly, a distinct light image may be implemented on the half mirror member 200 by the light emitting from the first light source portion 300 and directly penetrating through the half mirror member 200. In addition, since the distinct light image generates a difference in brightness from the light image reflected by the mirror member 500 and formed on the half mirror member 200, a sense of depth of a three-dimensional light image may be increased.

The half mirror member 200 may be disposed to cover the opening 120.

Figure 2:
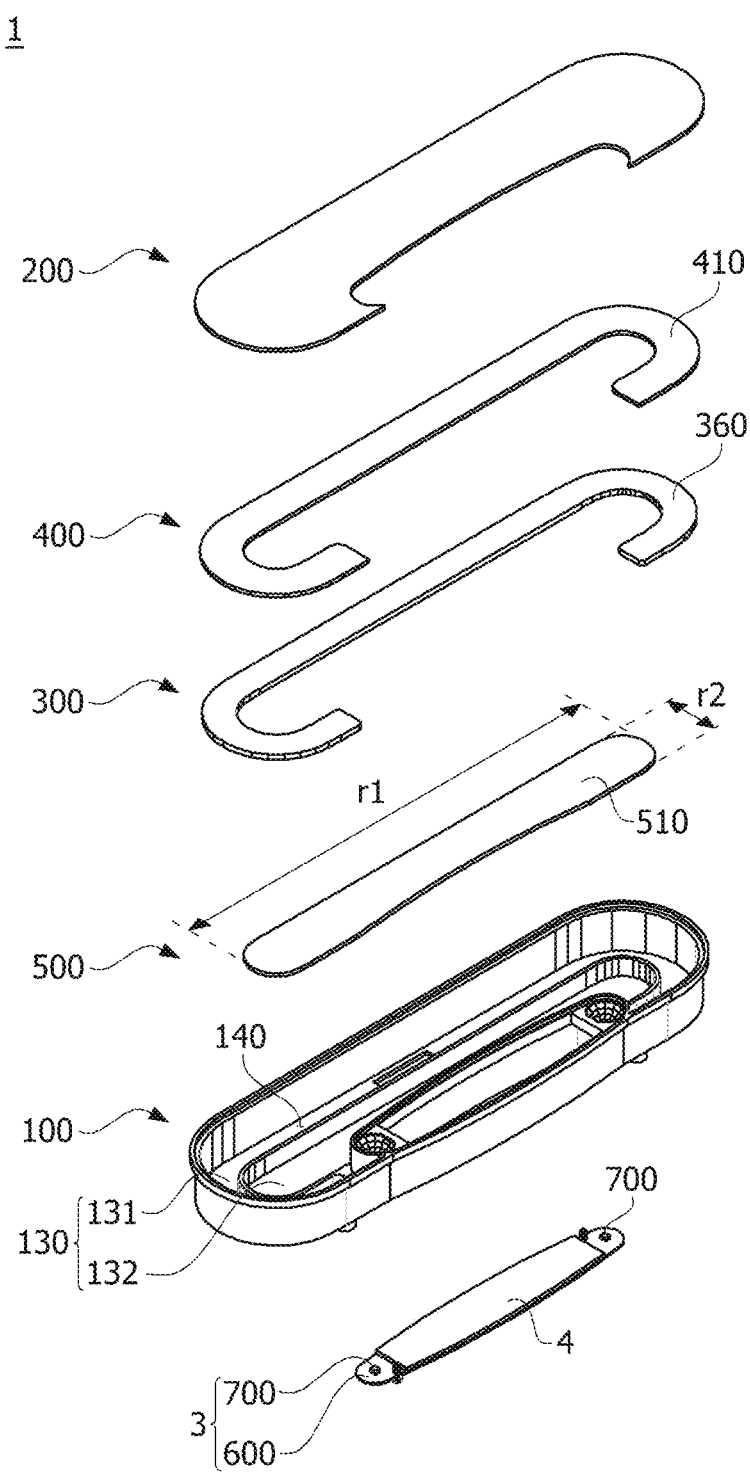
FIG. 2 is an exploded perspective view of the lighting device according to the embodiment.
Figure 5:
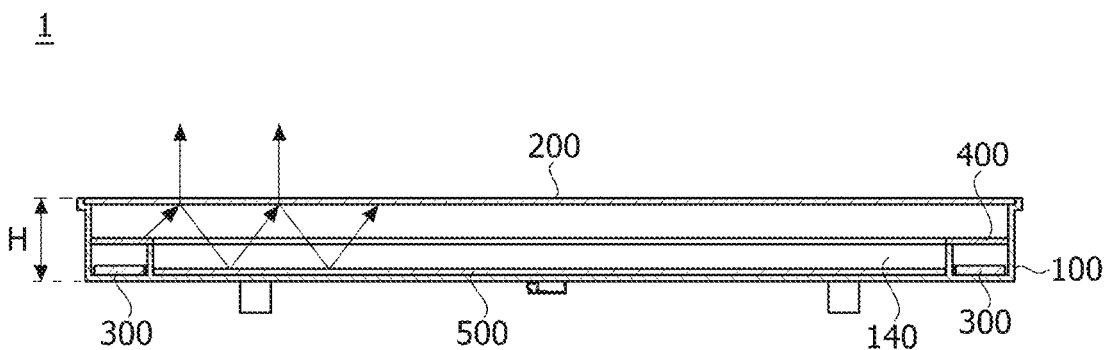
FIG. 5 is a cross-sectional view of the lighting device according to the embodiment taken along line B-B.

The half mirror member 200, as shown in FIG. 5, may transmit a part of light incident on the half mirror member 200 and may reflect another part. Also, the half mirror member 200, as shown in FIG. 2, may have a plate shape.

That is, the light emitted from the first light source portion 300 may be emitted outward through the opening 120. Here, the half mirror member 200 is disposed in the opening 120. Accordingly, the half mirror member 200 transmits a part of the light emitted from the first light source portion 300 and reflects another part. Also, since the reflected light is reflected by the mirror member 500, a three-dimensionally effective light image may be implemented on the half mirror member 200.

The half mirror member 200 may have a structure in which a metal layer is vapor-deposited on a substrate. Here, the substrate may be a variety of synthetic resin films, and the metal layer may include a metal material capable of being vapor-deposited such as Ni, Cr, Al, Ti, and the like. Accordingly, the half mirror member 200 may implement a further thickness-decreased structure. In this case, vapor deposition of the metal layer may be performed on one surface or both surfaces of the substrate, and a letter or picture having a particular shape may be added.

The first light source portion 300 emits light toward the half mirror member 200. Here, the first light source portion 300 may implement surface emission. That is, the first light source portion 300 may be provided as a surface light source.

Figure 9:
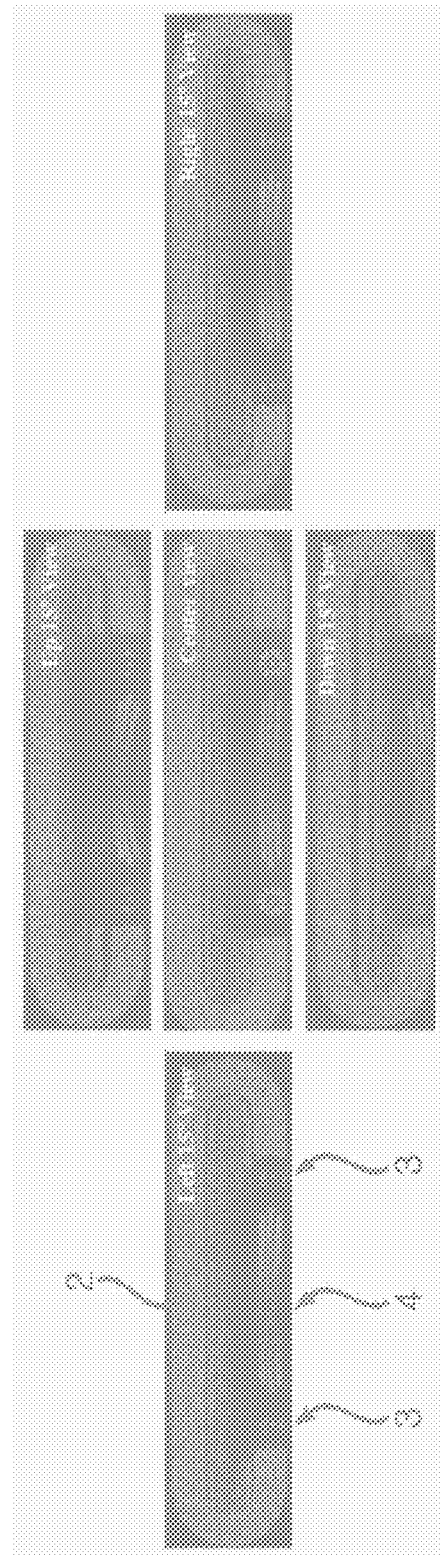
FIG. 9 is a view illustrating turned-on light images of the lighting device according to the embodiment according to viewing angles.
Figure 10:
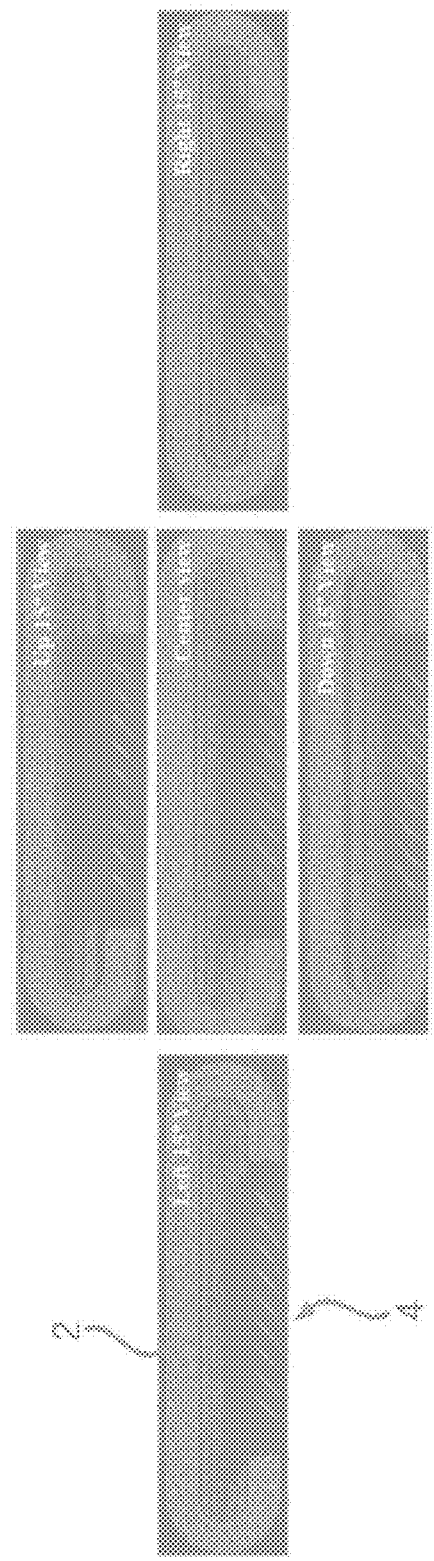
FIG. 10 is a view illustrating turned-on light images of a tail lamp portion and an image lamp portion of the lighting device according to the embodiment according to viewing angles.

As shown in FIGS. 2 and 3, the first light source portion 300 may be formed to have a C shape but is not limited thereto and may be modified into a variety of shapes in consideration of a degree of freedom in design and a light image of the lighting device 1. However, when the first light source portion 300 is formed having a C shape, since the mirror member 500 may be disposed thereinside, as shown in FIGS. 9 and 10, the light image may be implemented to have a sense of depth increasing in a direction toward the inside.

Meanwhile, the first light source portion 300 disposed on the first bottom surface 131 may be formed to have a certain thickness t1. Here, the thickness t1 of the first light source portion 300 may be changed in design in consideration of a three-dimensional effect of the light image.

Figure 4:
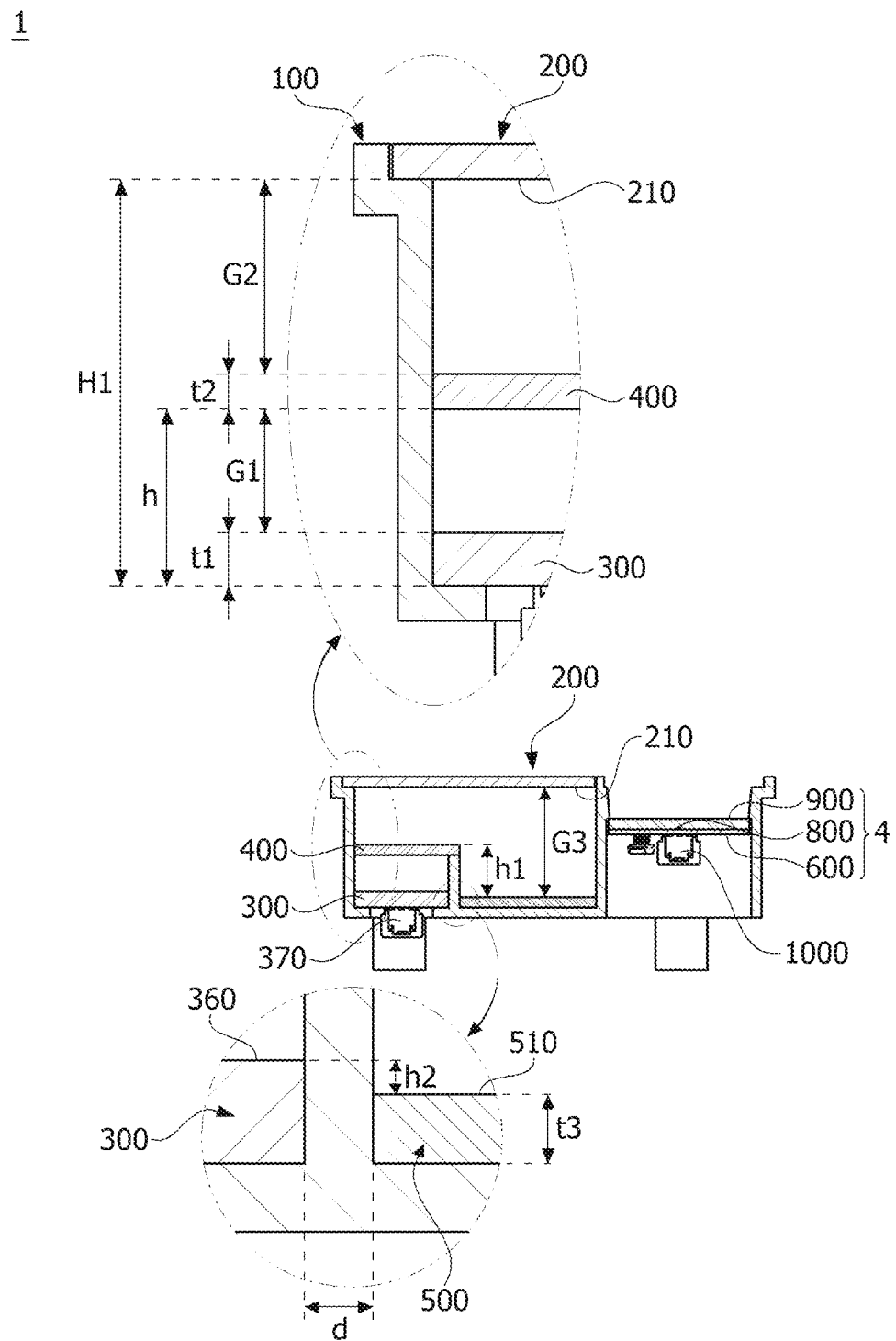
FIG. 4 is a cross-sectional view of the lighting device according to the embodiment taken along line A-A.

As shown in FIG. 4, a light emission surface 360 of the first light source portion 300 may be disposed to be spaced at a first gap G1 apart from the diffusion plate 400. Here, the light emission surface 360 of the first light source portion 300 may be disposed lower than a top end surface 141 of the guide portion 140.

Accordingly, an air gap may be formed between the first light source portion 300 and the diffusion plate 400. Since the air gap has a difference in a refractive index from that of the first light source portion 300, light uniformity may be improved.

Accordingly, the first gap G1 may improve light uniformity.

Here, the top end surface 141 of the guide portion 140 may be formed to be inclined at a certain angle.

Meanwhile, the first gap G1 and the thickness t1 of the first light source portion 300 may function as factors capable of adjusting the light uniformity. For example, the first gap G1 may be adjusted according to the thickness t1 of the first light source portion 300.

As shown in FIG. 4, since a sum of the first gap G1 and the thickness t1 of the first light source portion 300 is equal to the height h of the guide portion 140, the light uniformity may be improved as the height h of the guide portion 140 increases. However, since the top end surface 141 of the guide portion 140 may be disposed on a path of light reflected by the half mirror member 200, the height h of the guide portion 140 may preferably be in a range from 7 to 10 mm based on the bottom surface 130. Here, a height H1 from the bottom surface 130 to a bottom surface 210 of the half mirror member 200 may be in a range from 14 to 32 mm.

Figure 7:
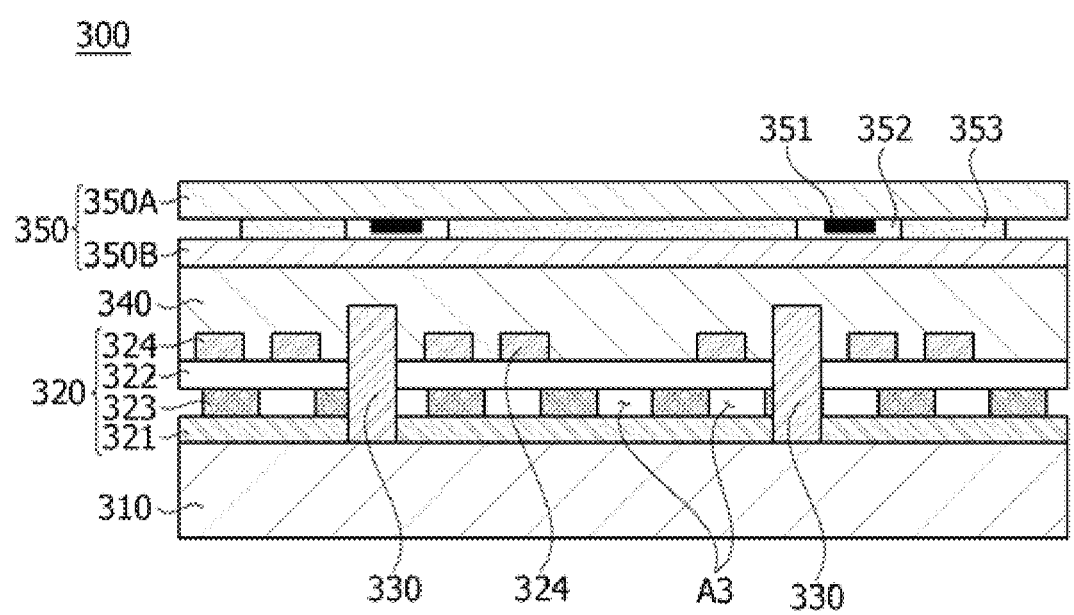
FIG. 7 is a view illustrating a first light source portion of the lighting device according to the embodiment.

Referring to FIG. 7, the first light source portion 300 may include a first printed circuit board 310, a reflection unit 320, a plurality of light emitting diodes (LED) light sources 330, a resin layer 340, and an optical pattern layer 350.

The first light source portion 300 includes the plurality of LED light sources 330 formed on the first printed circuit board 310. The reflection unit 320, which is laminated on the first printed circuit board 310 while being penetrated by the LED light sources 330, is included on a top surface of the first printed circuit board 310.

Particularly, in this case, an air area A3, in which air is disposed, is provided in the reflection unit 320. The air area A3 maximizes brightness by increasing reflection efficiency of light emitted from the light source 130.

For example, the reflection unit 320 may include a first reflection film 321 pressed against a surface of the first printed circuit board 310 and a second reflection film 322 having a transparent material and spaced apart from the first reflection film 321 to form the air area A3. The first and second reflection films 321 and 322 are laminated on the first printed circuit board 310, and the LED light sources 330 pass through holes formed in the reflection films 321 and 322 and protrude outside the reflection films 321 and 322.

It is possible to form the air area A3 in a structure in which the first and second reflection films 321 and 322 are integrally pressed together without using an additional member such as an adhesive and the like. In addition, as shown in FIG. 7, it is possible to implement the first and second reflection films 321 and 322 to be spaced apart from each other so as to implement the air area A3, which accommodates air, using spacing members 323 such as additional adhesive members and the like.

In this case, a reflective material reflecting light, for example, a film, on which a metal layer such as Ag and the like is formed, may be used as the first reflection film 321. As the second reflection film 322, it is preferable to use a transparent film such that light emitted from the LED is transferred to and reflected by a surface of the first reflection film 321. Particularly, in addition to light emitted from the light source 330 being transmitted through the first reflection film 321 and reflected by the second reflection film 322, a reflection pattern 324 may be provided by being white-printed on a surface of the second reflection film 322 such that dispersion of light may be further promoted to improve brightness.

The reflection pattern 324 provided to sharply improve reflection efficiency of light may be printed using a reflection ink including any one of $TiO_2$, $CaCO_3$, $BaSO_4$, $Al_2O_3$, Silicon, and PS.

Particularly, as the light source 330, a variety of types of light sources may be applied, and preferably, side-emissive LEDs may be used. In this case, the reflection pattern 324 may preferably be formed in a light emission direction of the LED light source and, particularly, may be disposed such that pattern density may increase in a direction away from the emission direction of the LED light source. Accordingly, when the side-emissive LEDs are used, there is an advantage of significantly reducing the number of light sources.

The resin layer 340 is laminated in a structure surrounding a periphery of the LED light source 330 so as to perform a function of dispersing light of the light source which is emitted in a lateral direction. That is, the resin layer 340 may perform a function of a light-guiding plate.

As the resin layer 340, any resins capable of basically diffusing light are usable. For example, as a main material of the resin layer 340, a resin using a urethane acrylate oligomer as a main row material may be used. For example, a mixture formed by mixing a urethane acrylate oligomer, which is a synthetic oligomer, with a polyacryline polymer type may be used. Here, a monomer, in which isobornyl acrylate (IBOA) which is a low-boiling point and diluent type reactive monomer, hydroxylpropyl acrylate (HPA), 2-hydroxyethyl acrylate (2-HEA), and the like are mixed, may be further included. As an additive, a light initiator (that is, hydroxycyclohexyl, phenyl-ketone, and the like), an antioxidant, or the like may be added thereto.

In addition, the resin layer 340 may include beads to increase diffusion and reflection of light. Accordingly, light emitted from the light sources 330 in a lateral direction may be diffused and reflected by the resin layer 340 and the beads so as to travel upward.

This may further promote a reflection function in addition to the reflection unit 320. Accordingly, the presence of the resin layer 340 may not only innovatively reduce a thickness of a conventional light-guiding plate so as to implement a size reduction of an entirety of a product but also has a flexible material so as to provide versatility to be applicable to a flexible display.

The optical pattern layer 350 may be disposed above the resin layer 340. Also, the optical pattern layer 350 may include an optical pattern 351.

The optical pattern layer 350 may include an adhesive pattern layer 353 which forms a second air area 352 surrounding a peripheral part of the optical pattern 351.

The adhesive pattern layer 353 may be formed by forming a separate space (the second air area) on a periphery of the optical pattern 351 and applying an adhesive material to other parts.

As shown in FIG. 7, in an arrangement relation between the optical pattern layer 350 and the adhesive pattern layer 353, the optical pattern layer 350 may include a first substrate 350A and a second substrate 350B with the optical pattern 351 therebetween. Here, the adhesive pattern layer 353 is applied to other parts other than the second air area 352 which surrounds the peripheral part of the optical pattern 351 so as to allow the first substrate 350A and the second substrate 350B to adhere to each other.

Here, the optical pattern 351 may be formed as a light-shading pattern formed to prevent the light emitted from the LED light source 330 from being concentrated. To this end, it is necessary to align the optical pattern 351 with the LED light sources 330. Also, after the alignment, the adhesion is performed using an adhesive for providing a fixing force.

Meanwhile, as the first substrate 350A and the second substrate 350B, a substrate formed of a material having excellent light transmittance may be used, and for example, PET may be used. In this case, the optical pattern 351 disposed between the first substrate 350A and the second substrate 350B may basically perform a function of preventing the light emitted from the LED light source from being concentrated and may be implemented by performing light-shading printing on any one of the first substrate 350A and the second substrate 350B. Also, the adhesive pattern layer 353 is an adhesive layer formed by applying an adhesive material having a structure surrounding a peripheral part of the light-shading pattern and may implement alignment by allowing the two substrates to adhere to each other. Here, the adhesive layer may be formed using thermosetting PSA, a thermosetting adhesive, an ultraviolet (UV)-thermosetting PSA type material.

Here, a top surface of the optical pattern layer 350 may be provided as the light emission surface 360.

Also, a first connector 370 may be disposed in the first light source portion 300 to apply power thereto. As shown in FIG. 4, the first connector 370 may be disposed below the first light source portion 300.

Accordingly, a mirror image such as that of a mirror may be implemented by the half mirror member 200 when the light source is not turned on, and a three-dimensionally effective light image may be formed on the half mirror member 200 when the light source is turned on.

The diffusion plate 400 may improve light uniformity of the light emitted from the first light source portion 300. Also, the diffusion plate 400 may diffuse or condense the light emitted from the first light source portion 300.

The diffusion plate 400 may be disposed on an optical path between the half mirror member 200 and the first light source portion 300. Accordingly, the light emitted from the first light source portion 300 passes through the diffusion plate 400 and is emitted toward the half mirror member 200.

As shown in FIG. 4, one side of the diffusion plate 400 may be supported by the guide portion 140. Accordingly, depending on the height h of the guide portion 140, light uniformity of light incident on the diffusion plate 400 may be adjusted.

Meanwhile, the diffusion plate 400 may be formed to have a certain thickness t2. Here, the diffusion plate 400 may be disposed to be spaced at a second gap G2 apart from the bottom surface 210 of the half mirror member 200.

Accordingly, air gaps may be formed above and below the diffusion plate 400 between the half mirror member 200 and the first light source portion 300. As described above, the air gaps may improve light uniformity.

Meanwhile, the second gap G2 is intimately associated with a light image implemented on the half mirror member 200. Here, when the height H of the housing 100 is determined, the height h of the guide portion 140 and the thickness t2 of the diffusion plate 400 function as significant factors which determine the second gap G2.

As shown in FIGS. 9 and 10, the second gap G2 may form a dark part in the light image implemented on the half mirror member 200.

Accordingly, a size of the dark part may be adjusted by the second gap G2. Also, the dark part may vivify the light image formed on the half mirror member 200 by a part of light emitted from the diffusion plate 400 which is directly transmitted through the half mirror member 200.

Meanwhile, the second gap G2 may be formed to be greater than the first gap G1. Accordingly, the lighting device 1 may provide definition of a light image.

The mirror member 500 may implement a three-dimensionally effective light image by re-reflecting light reflected by the half mirror member 200 toward the half mirror member 200.

As shown in FIG. 2, the mirror member 500 may be formed to have an elliptical shape in which a length r1 of one side is longer than a length r2 of the other side. That is, the mirror member 500 may be formed to have a shape fitting inside the guide portion 140.

The mirror member 500 may be disposed on the second bottom surface 132 and may be formed of a material having high reflection efficiency.

For example, the mirror member 500 may include a reflective material having a self-reflective property.

Also, the mirror member 500 may be implemented as a structure formed of an additional material and coated with a reflective material on a surface thereof.

The reflective material may be implemented by coating a surface of a metal or a synthetic resin material with a metal material layer having an excellent reflection property such as Ag and the like or a reflective material layer such as TiO2, CaCo3, BaSO4, Al2O3, silicon, PS, and the like. Additionally, it is possible to implement a synthetic resin layer which is coated with or includes titanium oxide, aluminum oxide, zinc oxide, lead carbonate, barium sulfate, or calcium carbonate. In addition, it is possible to use any one material of Al, PC, PP, ABS, and PBT which have self-reflective properties.

In addition, as another example, the reflective material may be formed as a film type and may include a synthetic resin containing a white pigment being dispersed therein to implement a property of promoting a reflection property of light and dispersion of light. For example, as the white pigment, titanium oxide, aluminum oxide, zinc oxide, lead carbonate, barium sulfate, calcium carbonate, and the like may be used. As the synthetic resin, polyethylene terephthalate (PET), polyethylene naphthalate (PEN), acrylic resin, polycarbonate, polystyrene, polyolefin, cellulose acetate, weatherproof vinyl chloride, and the like may be used but the present invention is not limited thereto.

The mirror member 500 may be formed to have a certain thickness t3. Here, the mirror member 500 may be disposed to be spaced at a third gap G3 apart from the bottom surface 210 of the half mirror member 200.

A three-dimensional effect of the light image may depend on a movement distance of light in the first space S1. Here, the movement distance of the light may be adjusted by the second gap G2 and the third gap G3. Also, the third gap G3 may be adjusted by the thickness t3 of the mirror member 500.

Accordingly, a reflective surface 510 of the mirror member 500 may be disposed to form a certain height difference h1 from a top surface 410 of the diffusion plate 400. Preferably, the reflective surface 510 of the mirror member 500 may be disposed to be lower than the top surface 410 of the diffusion plate 400. Accordingly, light uniformity may be secured while a sense of depth of the light image is further improved.

Here, a reflective surface 510 of the mirror member 500 may be disposed to form a certain height difference h2 from the light emission surface 360 of the first light source portion 300.

As shown in FIG. 4, the reflective surface 510 of the mirror member 500 may be disposed to be lower than the light emission surface 360 of the first light source portion 300. Accordingly, the sense of depth of the light image may be further improved.

Figure 8:
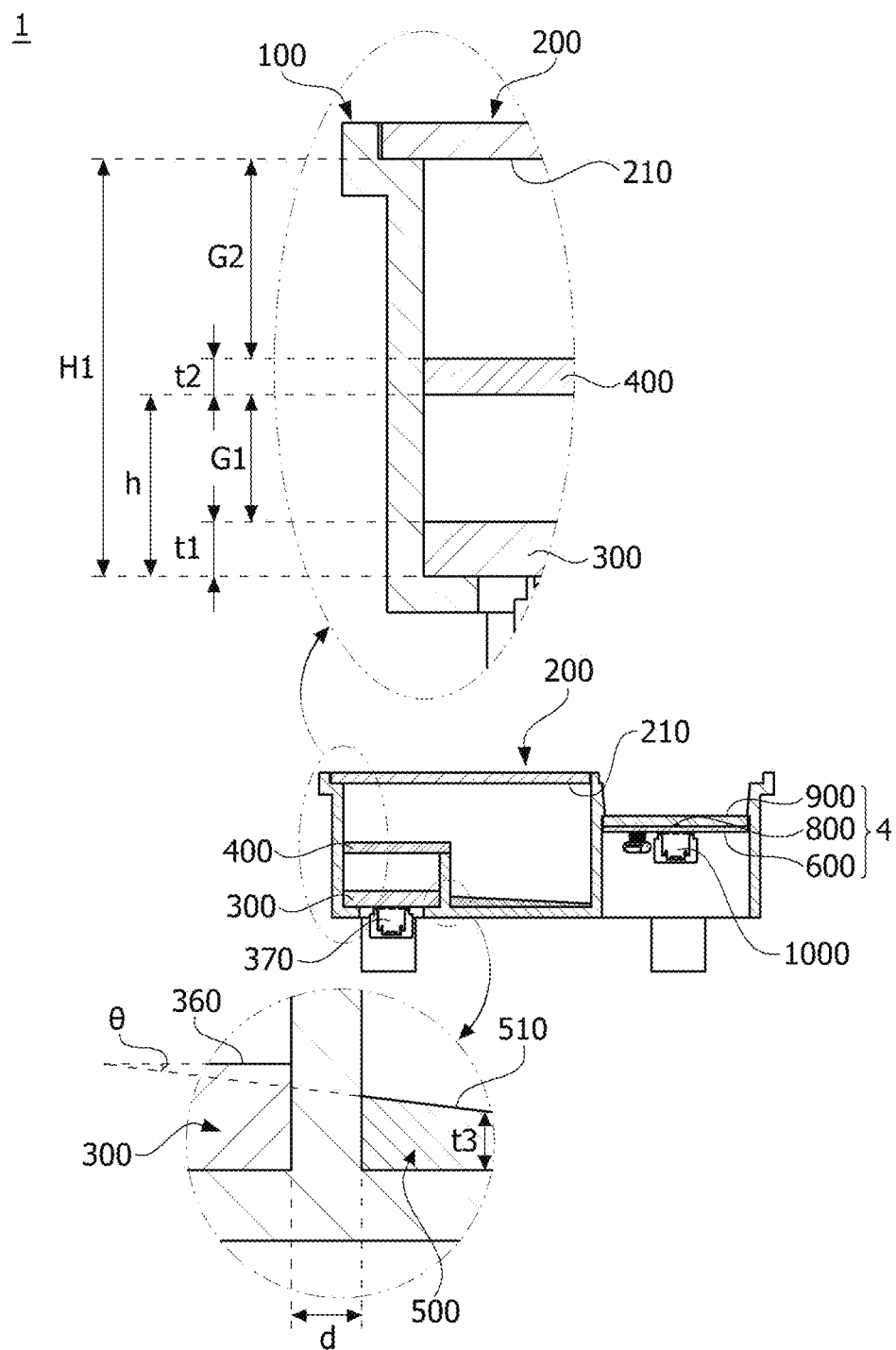
FIG. 8 is a view illustrating another example of a mirror member disposed in the lighting device according to the embodiment.

As shown in FIG. 8, the reflective surface 510 may be disposed to be inclined at a certain angle θ on the basis of the light emission surface 360 of the first light source portion 300. That is, the mirror member 500 may be formed such that the thickness t3 increases increasingly from one side toward the other side of the mirror member 500.

Accordingly, a shape of the light image may be adjusted by the angle θ of the reflective surface 510.

In comparison to an arrangement of the first light source portion 300 and the mirror member 500 in a horizontal structure (refer to FIG. 4), the reflective surface 510 disposed to be inclined at the certain angle θ as shown in FIG. 8 may adjust an incident angle of light incident on the reflective surface 510. Accordingly, a light image having a three-dimensional effect may be diversely modified.

The reflective surface 510 of the mirror member 500 may be exemplarily formed to have the inclined angle θ but is not limited thereto. For example, in consideration of the light image, the reflective surface 510 may be provided as a concave mirror, a convex mirror, or the like.

The stop lamp portion 3 of the lighting device 1 may be disposed in the second space S2. For example, the stop lamp portion 3 may be disposed inside the tail lamp portion 2. Here, the stop lamp portion 3 may emit light in the same direction as that of light emitted from the tail lamp portion 2.

The stop lamp portion 3 may include a second printed circuit board 600 and a second light source 700 disposed on the second printed circuit board 600. Also, the second light source 700 and a brake (not shown) of a vehicle may work together. Here, the second printed circuit board 600 may be formed of a flexible material.

Accordingly, as shown in FIG. 9, the stop lamp portion 3 is turned on when the brake operates such that a stall or speed reduction state of the vehicle may be recognized by a driver of a following vehicle thereof.

Accordingly, the lighting device 1 may further perform a function of a stop lamp.

The image lamp portion 4 of the lighting device 1 may be disposed in the second space S2. Here, the image lamp portion 4 may emit light in the same direction as that of light emitted from the tail lamp portion 2.

As shown in FIG. 1, the image lamp portion 4 of the lighting device 1 may be disposed between the stop lamp portions 3. For example, the image lamp portion 4 may be disposed between the second light sources 700 of the stop lamp portions 3.

The stop lamp portion 4 may include the second printed circuit board 600, a third light source 800 disposed on the second printed circuit board 600, and a pattern member 900 disposed on an optical path of the third light source 800.

The pattern member 900 images light emitted from the third light source 800. That is, the pattern member 900 images the light emitted from the third light source 800 to modify a shape of the light.

Accordingly, an optical pattern for a variety of shapes of light being imaged may be implemented in the image lamp portion 4. As an example, the optical pattern may be implemented in a form in which a minute slit pattern is formed in a sheet having a reflective material such that a part of light is transmitted through the slit pattern. Otherwise, a part of light is transmitted by forming a shape of the optical pattern using a partially transmittable material such that the shape of light may be diversified.

Accordingly, the lighting device 1 may further perform a function of an image lamp.

Meanwhile, the stop lamp portion 3 and the image lamp portion 4 are exemplarily formed using one second printed circuit board 600 but are not limited thereto.

Also, a second connector 1000 may be disposed below the second printed circuit board 600.

The second connector 1000 may apply power to the second light source 700 or the third light source 800.

Taken together, the lighting device 1 may implement a clear light image by securing light uniformity using the guide portion 140.

Also, the lighting device 1 may implement a three-dimensional effective light image through light with secured light uniformity using the half mirror member 200 and the mirror member 500.

Here, since the lighting device 1 may use the half mirror member 200, an image like a mirror may be implemented when the first light source portion 300 is not turned on and a three-dimensionally effective light image may be implemented when the first light source portion 300 is turned on.

Also, the lighting device 1 may implement a variety of light images by adjusting at least one of the height h and a width d of the guide portion 140, the thickness t2 of the diffusion plate 400, and the thickness t3 of the mirror member 500.

For example, in a limit in the preset height H of the housing 100, the three-dimensional effect of the light image may be adjusted by the second gap G2 and the third gap G3. Also, since the second gap G2 and the third gap G3 are adjusted by the height h of the guide portion 140, the thickness t2 of the diffusion plate 400, and the thickness t3 of the mirror member 500, the lighting device 1 may implement a variety of three-dimensional effects of a light image by adjusting at least one of the height h of the guide portion 140, the thickness t2 of the diffusion plate 400, and the thickness t3 of the mirror member 500.

Here, since definition of the light image depends on light uniformity, the light uniformity may be adjusted by an air gap formed by the first gap G1. Also, the first gap G1 may be adjusted by the height h of the guide portion 140, the thickness t1 of the first light source portion 300, and the diffusion plate 400.

That is, the height h of the guide portion 140 may be applied as common factors related to the three-dimensional effect and light uniformity of the light image.

Also, a size of the dark part formed by the second gap G2 may be adjusted by the height h of the guide portion 140.

Also, the separation distance d between the first light source portion 300 and the mirror member 500 may be determined by the width d of the guide portion 140. Also, the separation distance d may have an effect on a reflection angle of light.

Accordingly, a size of the guide portion 140 provides criteria related to an arrangement of the first light source portion 300, the diffusion plate 400, and the mirror member 500 and may be a most significant factor in designing of the lighting device 1. Accordingly, the guide portion 140 operates as a significant factor in aspects of a three-dimensional effect of the light image and the definition and light uniformity of the light image.

Here, the lighting device 1 may implement a clear light image while implementing a variety of light images using the guide portion 140.

Meanwhile, since the lighting device 1 may further include the stop lamp portion 3 turned on by the brake being operated, the lighting device 1 may further perform a function of a stop lamp.

Also, the lighting device 1 may implement a variety of light images through the image lamp portion 4 including the pattern member 900. Accordingly, the lighting device 1 may further improve a degree of freedom in design and aesthetics.

Although an exemplary embodiment of the present invention has been described above, it should be understood by one of ordinary skill in the art that a variety of modifications and a variety of changes may be made without departing from the concept and scope of the present invention which are defined in the following claims. Also, differences related to the modifications and applications will be interpreted as being included in the scope of the present invention defined by the attached claims.

DESCRIPTION OF REFERENCE NUMERALS

1: lighting device, 2: tail lamp portion, 3: stop lamp portion, 4: image lamp portion, 100: housing, 140: guide portion, 200: half mirror member, 300: first light source portion, 400: diffusion plate, 500: mirror member, 600: substrate, 700: second light source, 800: third light source, 900: pattern member

The invention claimed is:
1. A lighting device comprising:
a housing with an opening formed therein;
a half mirror member disposed in the opening;
a first light source portion configured to emit light toward the half mirror member;
a mirror member configured to reflect light reflected by the half mirror member;
a diffusion plate disposed between the first light source portion and the half mirror member; and
a guide portion integrated with a bottom surface of the housing, and protruding from the bottom surface of the housing, the guide portion configured to distinguish the bottom surface of the housing into a first bottom surface and a second bottom surface,
wherein the housing comprises a first area and a second area which are formed by the guide portion,
wherein the first light source portion is disposed in the first area and is disposed on the first bottom surface, and the mirror member is disposed in the second area and is disposed on the second bottom surface, and
wherein the diffusion plate is supported by the guide portion.

2. The lighting device of claim 1, wherein the guide portion is formed to protrude from the bottom surface, in a first direction, to a certain height (h) above the bottom surface, and the first light source portion and the mirror member are arranged to be spaced at a certain distance d apart due to the guide portion.

3. The lighting device of claim 2, wherein a light emission surface of the first light source portion is disposed to be spaced at a first gap G1 apart from the diffusion plate, in the first direction.

4. The lighting device of claim 3, wherein the first light source portion is formed to have a certain thickness t1 in the first direction, and the first gap G1 is adjusted according to the thickness t1 of the first light source portion.

5. The lighting device of claim 4, wherein the diffusion plate is disposed to be spaced at a certain second gap G2 apart from a bottom surface of the half mirror member in the first direction.

6. The lighting device of claim 5, wherein the diffusion plate is formed to have a certain thickness t2 in the first direction, and the second gap G2 is adjusted according to the thickness t2 of the diffusion plate.

7. The lighting device of claim 5, wherein the second gap G2 is greater than the first gap G1.

8. The lighting device of claim 1, wherein a reflective surface of the mirror member is disposed to be spaced at a certain third gap G3 apart from a bottom surface of the half mirror member in the first direction.

9. The lighting device of claim 8, wherein the mirror member is formed to have a certain thickness t3 in the first direction, and the third gap G3 is adjusted according to the thickness t3 of the mirror member in the first direction.

10. The lighting device of claim 9, wherein the reflective surface of the mirror member is disposed to form a certain height difference h1 from a top surface of the diffusion plate while being disposed to be lower than the top surface of the diffusion plate.

11. The lighting device of claim 10, wherein the reflective surface of the mirror member is disposed to form a certain height difference h2 from a light emission surface of the light source portion.

12. The lighting device of claim 11, wherein the reflective surface of the mirror member is disposed to be inclined at a certain angle θ on the basis of the light emission surface of the light source portion.

13. The lighting device of claim 1, further comprising a stop lamp portion disposed in the housing,
wherein the stop lamp portion comprises a second printed circuit board and second light sources disposed on the second printed circuit board, and
wherein the second light sources are turned on by a brake of a vehicle being operated.

14. The lighting device of claim 13, further comprising a third light source disposed on the second printed circuit board and a pattern member disposed on an optical path of the third light source,
wherein the pattern member modifies a shape of light emitted from the third light source.

15. The lighting device of claim 13, further comprising an image lamp portion disposed between the second light sources of the stop lamp portion.

* * * * *